Oct. 20, 1959  M. P. SEIDEL ET AL  2,909,740
RESINOUS MOLDING COMPOSITIONS AND STRUCTURES
EMBODYING METALLIC MEMBERS CAST THEREIN
Filed April 7, 1955  2 Sheets-Sheet 1

WITNESSES

INVENTORS
Martin P. Seidel &
Clifford J. Bell
BY
ATTORNEY

United States Patent Office 2,909,740
Patented Oct. 20, 1959

2,909,740

RESINOUS MOLDING COMPOSITIONS AND STRUCTURES EMBODYING METALLIC MEMBERS CAST THEREIN

Martin P. Seidel, Hickory Township, Mercer County, Pa., and Clifford J. Bell, Hubbard, Ohio, assignors to Westinghouse Electric Corporation, East Pittsburgh, Pa., a corporation of Pennsylvania Application April 7, 1955, Serial No. 500,008

7 Claims. (Cl. 336—90)

The present invention relates to tough and flexible resinous compositions and has particular reference to compositions containing both polyester resins and normally liquid resinous polymeric epoxides adapted to be cured to a solid state without undergoing substantial volume shrinkage, and to structures embodying metallic members cast in such compositions.

Heretofore, attempts have been made to provide resinous molding compositions suitable for casting around metallic members, such as metallic pieces of electrical apparatus, which will thermoset to a solid which is sufficiently elastic throughout an extreme range of temperatures, for example, from −50° C. to 150° C., to withstand shocks and abuse without cracking, chipping, shrinking or otherwise failing. Such resinous compositions would be particularly suitable for use, for example, as lead seals or bushings for conductor bars on certain types of transformers.

Furnace transformers, for example, are special types of power transformers operating at amperages on the order of several thousand and at voltages which seldom exceed 2,000 to 3,000 volts. Massive conductor lead bars which are rectangular, rather than circular, in cross section are used in transformers operating at such amperages and voltages. These bars are relatively large so that conventional bushing materials and construction are inadequate to accommodate them. Such conventional bushings have the further disadvantage in that they frequently do not provide seals which are capable of withstanding either vacuum or gas pressure. It has also been observed that the seals obtained when elastomeric bushings are used sometimes deteriorate in time and permit the entrance into the transformer of water and air, both of which materials have deleterious effects on the properties of the mineral oils commonly used as insulating fluids and heat transfer media in the transformers.

The object of the present invention is to provide a castable resinous composition comprising a polyester resin, a normally liquid resinous polymeric epoxide, and a thickening agent adapted for casting around metallic members to provide a mounting for such members which will not crack, chip or shrink during curing of the composition or during its subsequent use.

Another object of the invention is to provide electrical apparatus having a hardenable insulating composition applied thereto comprising a polyester resin, a normally liquid resinous polymeric epoxide, and a thickening agent, said composition being curable to a solid which does not crack, chip, or shrink during curing or subsequent use.

Another object of the invention is to provide means for mounting metallic conductor bars in the upper closure member of a transformer case in such manner whereby the bars are aligned with one another and the low voltage windings of the transformer when the cover member is mounted on the case.

Other and further objects of the invention will, in part, be obvious and will, in part, appear hereinafter.

It has now been discovered that the foregoing objects are attained in a completely reactive castable resin composition comprising (A) from 60% to 40% by weight of a polyester resin derived by heating at a temperature of from 150° C. to 260° C. (a) one mole of at least one unsaturated dicarboxylic acid selected from the group consisting of fumaric acid, itaconic acid, maleic acid, maleic anhydride, chloromaleic acid, citraconic anhydride, and citraconic acid, (b) from 3 to 15 moles of at least one saturated dicarboxylic acid selected from the group consisting of adipic acid, succinic acid, diglycolic acid, azelaic acid, succinic anhydride, suberic acid, and sebacic acid, (c) from 0.5 to 5 moles of propylene glycol, and (d) from 14 to 9 moles of ethylene glycol, the glycols providing sufficient hydroxyl groups to exceed by at least 5% but not over 15% the number of carboxyl groups in the acidic compounds, (B) from 40% to 60% by weight of a normally liquid resinous polymeric epoxide or glycidyl polyether, to be defined hereinafter, and (C) from 10% to 40% by weight, based on the total weight of (A) plus (B), of a bentonite-amine reaction product.

This composition is a pasty, putty-like material. It cures to a tough and flexible solid on heating in the presence of at least one vinyl addition-type polymerization catalyst, for example, t-butyl peroxide. Such catalysts are convenient, safe and relatively easy to employ. It is a feature of this invention that a specific catalyst, such as polyamines, for curing the resinous polymeric epoxide need not be used in curing the resinous composition of this invention to a solid state. The cured resin herein disclosed has excellent thermal stability characteristics, good electrical insulating properties, and remains tough and flexible at temperatures within the range of −50° C. to 150° C.

The casting compositions of this invention are useful not only for mounting conductor bars on transformers but may be employed as castings around other metallic members, for example, thermal demand meter coils, railway air-blast coils, and the like.

For a more complete understanding of the nature of the invention, reference is made to the following description taken in conjunction with the accompanying drawing, in which.

Figure 1:
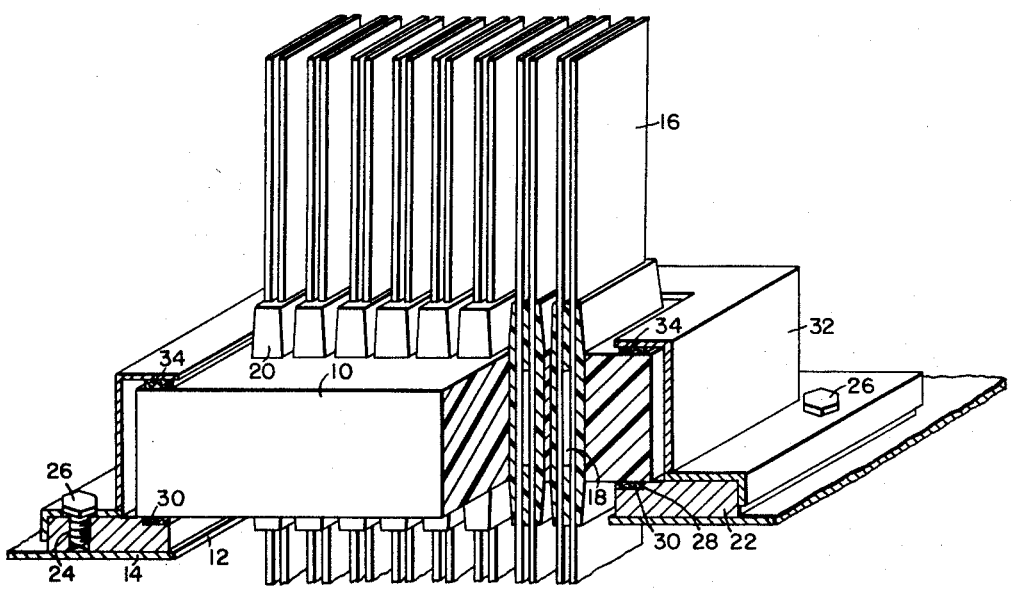
Figure 1 is a view in perspective of the upper-closure member of a transformer case, parts having been broken away to show structural details.

Referring now to Fig. 1 of the drawing there is illustrated a bushing 10 adapted for closing the opening 12 in the upper portion of a transformer case 14. The dimensions and shape of the bushing 10 will be determined by the particular transformer design. The bushing illustrated is rectangular in shape and made large enough to overlap the opening 12 in the top of the transformer casing.

Figure 2:
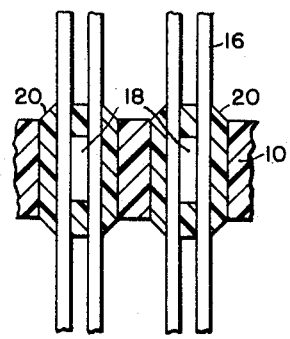
Fig. 2 is an enlarged, fragmentary view in cross section illustrating two pairs of transformer conductor bars cast in the resinous molding compositions of this invention.

A set of conductor bars 16 is mounted in bushing 10. For the particular furnace transformer illustrated, the bars 16 are about 1 inch in thickness at their center section, 8 inches wide, and 24 inches long. As illustrated more clearly in Fig. 2, the bars 16 are mounted in pairs, each bar in each pair being separated by a spacer block 18 made of a suitable material, for example, copper. Each pair of bars 16, with its associated spacer block 18, has a quantity of the resinous molding composition 20 of this invention applied, as by troweling, about its center section to a thickness of about ⅛ to ½ inch. The composition 20, when heated to a temperature of from 125° C. to 135° C. for a period of about 24 hours, cures to a tough and flexible solid.

In the transformer illustrated, the bars 16 are mounted in pairs, the bushing 10 being constructed to carry exceptionally heavy currents. The bushing is designed for a single-phase transformer or for one phase of a three-phase transformer and carries 8 pairs of bars, each of which pair of bars is connected to one coil of the transformer winding.

One convenient method for preparing bushing 10 and mounting bars 16 therein comprises suspending the pairs of bars, with their associated spacer blocks 18 and the cured composition 20 applied thereto, in a predetermined spacial arrangement within a wooden frame or mold having side walls of a size sufficient to overlap the opening 12 in the top of transformer case 14. The wooden frame or mold preferably is made liquid tight by sealing the pores thereof with a wax such as a paraffin. A suitable casting resin for use in preparing bushing 10 comprises one containing the following ingredients:

| | Parts by weight |
|---|---|
| Epoxy Resin (prepared as described in Example II, below) | 30 |
| Silica | 70 |
| Metaphenylene diamine | 2 |
| Diethylene triamine | 1 |

This is a sirupy liquid mixture which is poured into the frame to a depth of approximately two inches, after which it is allowed to stand at room temperature to season for about 24 hours. This process then is repeated two additional times, the casting resin being introduced into the frame to a depth of about two inches with each pouring. The entire casting then is placed in an oven and baked for about 15 hours at 125° C. The resinous casting then is allowed to cool to room temperature and the wooden framework is removed. The casting, with the transformer conductor bars embedded therein, then is positioned on a mounting plate 22.

Mounting plate 22, of a size and shape such that it conforms to the opening 12 in the transformer top, is welded to the top 14 of the transformer. The plate 22 is thick enough to permit it to be drilled and threaded to provide threaded openings 24 for receiving screw bolts 26, the purpose of which will be described hereinafter.

Plate 22 has a slot 28 in the upper face thereof which extends throughout the perimeter of the inside of plate 22. In slot 28 there is disposed a gasketing member 30 made of cork, rubber or like resilient material. A metal clamping bracket 32 is provided and is of a design such that it is adapted to engage the upper surface of bushing 10, the side wall of bushing 10 and the upper surface and side wall of plate 22. The bracket 32 is provided with holes in alignment with threaded holes 24 in plate 22. Screw bolts 26 pass through the holes in bracket 32 and are threaded into holes 24 to tightly mount bushing 10 upon top 14 of the transformer. A second gasket member 34 is disposed between the inner surface of bracket 32 and the outer surface of block 10, as shown on the drawing. This gasket helps to distribute bolting stress uniformly on bushing 10.

Figure 3:
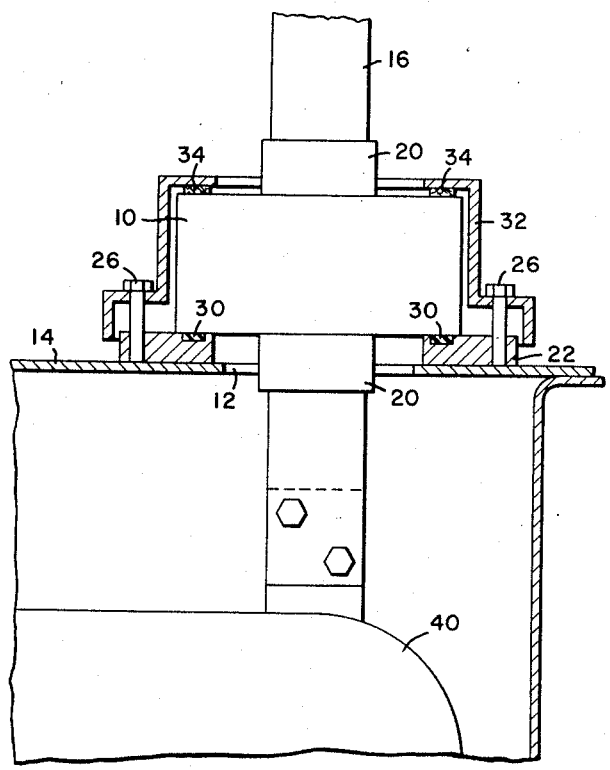
Fig. 3 is a fragmentary side view partly in cross section illustrating a transformer provided with secondary windings and an upper closure member.

It will be observed that in the completed structure the conductor bars 16 are cast within the epoxy casting 10 in such manner that the epoxy resin casting 10 surrounds the resinous composition 20 applied to the bars and the bars align with the secondary windings 40, see Figure 3. The resin 20 applied to the conductor bars 16 is tough and flexible and that forming the bushing 10 is hard and tough. This combination insures a long lasting gas-tight seal for transformers.

The polyester resin employed in preparing the resinous molding compositions of this invention may be prepared in accordance with usual esterification procedures. Thus, the acidic materials, glycols and glycerol, may be heated in the presence of one or more esterification catalysts, such as mineral acids including sulfuric acid and hydrochloric acid, or organic acids, such as benzene sulfonic acid, para-toluene sulfonic acid, and the like. Preferably, the esterification reaction is carried out by heating the materials in the amounts specified above to a temperature within the range of about 150° C. to about 260° C. While any of the unsaturated dicarboxylic acids set forth hereinabove may be used in preparing the polyester starting material of this invention, fumaric acid has been found to be the most satisfactory. The polyesters obtained using this acid in combination with a saturated dicarboxylic acid such as adipic acid have proven to be particularly satisfactory. Excellent esters are obtained using a molar ratio of adipic acid to fumaric acid of 3:1, 5:1 and 12:1. Satisfactory polyesters also are obtained where a mixture of 12 moles of saturated acids comprising about twice as much succinic acid as adipic acid are used for each mole of unsaturated fumaric acid.

It is a feature of this invention that the polyester resin can be prepared by substituting up to 20 mole percent of the ethylene and propylene glycol with higher glycols. Thus, diethylene glycol, 1,3-butylene glycol, triethylene glycol, and neopentylene glycol may be substituted for an equimolar proportion of either the ethylene or propylene glycol or both. The glycols are used in amounts sufficient to provide hydroxyl groups to exceed by at least 5% but not over 15% the number of carboxyl groups in the dicarboxylic acids. Each anhydride of a dicarboxylic acid is equivalent to a single carboxyl group.

It has been found that glycerol may be included in the reaction product in amounts of from 0.1 to 0.75 mole with advantage. Good elastic properties combined with a thermoset condition result from the use of 0.23 to 0.35 mole of glycerol per 13 moles of the two acids. However, the glycerol may be left out, and an excellent resinous composition will be produced.

The following example illustrates the preparation of a polyester suitable for use in preparing the resinous molding compositions of this invention.

*Example I*

Into a reaction vessel equipped with a stirrer, gas sparging means, and an air condenser were charged the following:

12.0 moles adipic acid
1.0 mole fumaric acid
2.3 moles propylene glycol
12.0 moles ethylene glycol, and
0.3 mole glycerol The stirrer was put into operation and carbon dioxide gas was admitted to sparge the vessel. The vessel then was heated gradually to a temperature between 160° C. and 180° C., the condenser being operated for the first several hours of the esterification reaction to return any glycol to the reaction zone that was entrained with any of the water evolved during the reaction. The condenser then was disconnected and the vessel was heated to 225° C. and maintained at that temperature for 12 to 16 hours.

It has been determined that esterification is aided when azeotropic distillation procedures are employed to carry off the water formed during the reaction. The removal of water formed during the esterification reaction is facilitated by carrying out the esterification in the presence of an azeotroping volatile organic liquid such as toluene, xylene, or the like.

Other polyester resins have been prepared following the procedure described in Example I employing minor changes in the reactants. Thus, the glycol mixture has been varied to comprise as little as 0.5 mole up to 5 moles of propylene glycol, the amount of ethylene glycol employed being varied correspondingly to maintain the total number of moles of glycol constant. Highly satisfactory results have been obtained employing the glycerol in amounts within the range of 0.25 to 0.35 mole.

The resinous polymeric epoxides, also known as glycidyl polyethers, employed in preparing the resinous molding compositions of the present invention may be prepared by reacting predetermined amounts of at least one polyhydric phenol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such for example as 4,4'-dihydroxy-diphenyl-dimethyl-methane (referred to hereinafter as bis-phenol "A") and 4,4'-dihydroxy-diphenyl-methane. In admixture with the named polynuclear phenols, use also may be made of those polynuclear phenols wherein the phenol nuclei are joined by sulfur bridges such, for example, as 4,4'-dihydroxy-diphenyl-sulfone.

While it is preferred to use epichlorohydrin as the epihalohydrin in the preparation of the resinous polymeric epoxide starting materials of the present invention, homologues thereof, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The resinous polymeric epoxide, or glycidyl polyether of a dihydric phenol, suitable for use in this invention has a 1,2-epoxy equivalency greater than 1.0.

By epoxy equivalency reference is made to the average number of 1,2-epoxy groups

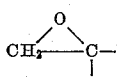

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers is thus a value between 1.0 and 2.0.

Resinous polymeric epoxides or glycidyl polyethers suitable for use in accordance with this invention may be prepared by admixing and reacting from one to two mole proportions of epihalohydrin, preferably epichlorohydrin, with about one mole proportion of bis-phenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" may be admixed first and then the epichlorohydrin added thereto, or an aqueous solution of alkali and bis-phenol "A" may be added to the epichlorohydrin. In any case, the mixture is heated in the vessel to a temperature within the range of about 80° C. to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali.

The following example illustrates the preparation of a glycidyl polyether suitable for use in preparing the resinous molding composition of this invention.

*Example II*

Fifty-four parts of sodium hydroxide were dissolved in about 600 parts of water in an open kettle provided with a mechanical stirrer. About 3 moles of bis-phenol "A" were added and the resultant mixture was stirred for about 10 minutes at a temperature of about 30° C. Thereafter, approximately 4 moles of epichlorohydrin were added, whereupon the temperature of the resultant mixture increased to about 60° C. to 70° C. due to the heat of reaction. About 42 parts of caustic soda dissolved in about 9 parts of water then were added with continuous stirring and the mixture was maintained at a temperature of about 90° C. to 100° C. for a period of about one hour. The mixture then was permitted to separate into two layers. The upper layer was withdrawn and discarded and the lower layer was washed with boiling water to which was added acetic acid in an amount sufficient to neutralize unreacted caustic soda. A liquid resinous reactive polymeric epoxide was obtained after substantially all of the wash water had been removed.

The bentonite-amine base reaction products employed in this invention are essential to the production of satisfactory thixotropic resinous casting compositions. These reaction products afford a unique filler material which imparts excellent thixotropic properties to the molding compositions whereby the composition may be troweled onto vertical surfaces and cured at elevated temperature without any significant quantity of the composition draining off.

The bentonite-amine base reaction products are composed of a montmorillonite mineral in which at least a part of the cation content of the mineral has been replaced by a cation of an organic base. Clays that contain as a primary constituent a mineral of the group known as montmorillonites are generally referred to as bentonites. Bentonites in their raw state are hydrophilic but upon reacting with organic bases or their salts become organophilic products.

More specifically, a bentonite clay of the character described and exhibiting substantial base-exchange capacity is reacted with an organic compound, more particularly one generally known as an onium compound, by substituting for the clay cation the cation of the organic compound. The reaction product may be prepared not only from a base-salt reacted with a clay-salt, but from a free base reacted with an acid clay.

Examples of organic base compounds and their salts usable in the practice of the invention are salts of aliphatic, cyclic, aromatic, and heterocyclic amines; primary, secondary, tertiary and polyamines; quaternary ammonium compounds, as well as other monovalent or polyvalent onium compounds.

In practicing this invention, aliphatic amine salts having from 12 to 20 carbon atoms, for example, hexadecyl amine salts and octadecyl amine salts, yield excellent results. The ratio of the amine compound to bentonite may be varied within certain limits in converting the bentonite to the organophilic condition. In general, however, it is desirable to react the amine salt with the bentonite in the approximate ratio of 100 milliequivalents of amine salt to 100 grams of bentonite. Reaction products produced within this ratio give the maximum swelling as tested in nitrobenzene.

It will be understood that when reference is made to basic organic onium compounds such as amines, it is implied that before reacting with the clay by base-exchange the amine is converted to the onium form, either by the addition of acid or by reason of the fact that some part of the inorganic base in the naturally occurring clay consists of hydrogen.

The following is an example of the preparation of a bentonite-amine reaction product suitable for use in accordance with the present invention:

Example III

One thousand grams of a Wyoming bentonite is dispersed in 25.45 liters of water, and the slurry formed is allowed to stand for two hours to settle out the non-clay impurities. In a separate vessel, 54.37 grams of glacial acetic acid is added to 240 grams of octadecyl amine, and the amine salt is then dissolved in 1.45 liters of warm water. Upon addition of the amine salt solution to the dispersed bentonite flocculation occurs and the precipitate, after being filtered, washed, dried and pulverized, constitutes the bentonite-organic base reaction product.

Other examples of suitable onium compounds and processes indicating how a bentonite-organic base reaction product may be prepared are found in U.S. Patent No. 2,531,40 to Jordan, issued November 28, 1950, and in U.S. Patent No. 2,531,427 to Hauser, issued November 28, 1950. One or more of the bentonite-amine reaction products may be employed in the compositions of the invention.

The bentonite-amine reaction product is used in an amount within the range of about 10% to 40% by weight, preferably 15% to 25% by weight based on the total weight of the polyester resin plus the resinous polymeric epoxide.

In preparing the moldable compositions of this invention the bentonite-amine reaction product is blended with a mixture of polyester resin and resinous polymeric epoxide. Inasmuch as a relatively large amount of the bentonite-amine reaction product is incorporated in the composition, a relatively thick, pasty, high viscosity, putty-like mass is obtained.

The pasty mass may be cured to a thermoset resin by heating the same in the presence of one or more vinyl addition-type polymerization catalysts. Examples of such catalysts include benzoyl peroxide, lauroyl peroxide, methyl ethyl ketone peroxide, t-butyl hydroperoxide, ascaridole, tert-butyl perbenzoate, di-t-butyl diperphthalate, ozonides, and similar catalysts in an amount of from 0.1% to 2% by weight of the polyester resin, although somewhat larger or smaller amounts may be employed if desired. Polymerization accelerators such as cobalt naphthenate, chromium acetyl acetonate, and azomethines also may be employed. Polymerization also may be effected through the utilization of actinic light.

While their use is not essential, a relatively small proportion of one or more polymerization inhibitors may be incorporated in the putty-like material to aid in extending its storage or shelf-life prior to its intended use by preventing premature polymerization. Inhibitors which are suitable for this purpose include substituted phenols and aromatic amines. More specific examples of suitable polymerization inhibitors include hydroquinone, resorcinol, tannin, and sym. alpha, beta-naphthyl p-phenylene diamine, and N-phenyl-beta-naphthylamine. The inhibitor, if employed, should be present in only relatively small proportions. Thus, amounts less than about 1.0% should be used, with amounts as small as about 0.01% to about 0.1% by weight generally being sufficient.

To indicate more fully the nature and capabilities of the resinous molding compositions of this invention, the following specific examples are set forth. The parts given are by weight unless otherwise indicated.

Example IV

The following ingredients were admixed in the amounts indicated:

|  | Parts |
|---|---|
| Polyester of Example I | 50 |
| Epoxide of Example II | 50 |
| Bentonite-amine reaction (product of Example III) | 30 |
| Monostyrene | 5 |
| Benzoyl peroxide | 0.5 |
| Triethanolamine borate | 2 |
| Cobalt naphthenate | 0.5 |
| Chromium acetyl acetonate | 0.5 |

The ingredients, when thoroughly admixed, comprised a pasty, putty-like material which could be troweled about the center section of pairs of conductor bars in a thickness of from ⅛ to ½ inch. The bentonite-amine reaction product imparted sufficient thixotropic properties to the composition to prevent the same from draining off the bars while the composition was cured by heating at 130° C. for 24 hours. The relatively small amount of monostyrene served as a carrier for the benzoyl peroxide catalyst, making the catalyst more convenient to handle. The monostyrene polymerized with the polyester resin to form a part of the pasty product.

Example V

A resinous molding composition having as satisfactory characteristics as that described in Example IV was prepared by admixing:

|  | Parts |
|---|---|
| Polyester of Example I | 50 |
| Epoxide of Example II | 50 |
| Bentonite-amine reaction (product of Example III) | 30 |
| Benzoyl peroxide | 3 |
| Triethanolamine borate | 2 |
| Cobalt naphthenate | 0.5 |
| Chromium acetyl acetonate | 0.5 |

This composition, after application to conductor bars and cured at 135° C. for 24 hours, provided a tough and flexible resin.

While the invention has been described with reference to particular embodiments thereof, it will be understood, of course, that certain changes, substitutions and modifications may be made therein without departing from its true scope.

We claim as our invention:

1. A completely reactive castable resin composition which thermosets to a tough and flexible solid comprising a mixture of (A) from 60% to 40% by weight of a polyester resin derived by heating at a temperature of from 150° C. to 260° C. (a) one mole of at least one unsaturated dicarboxylic acid selected from the group consisting of fumaric acid, itaconic acid, maleic acid, maleic anhydride, chloromaleic acid, citraconic anhydride, and citraconic acid, (b) from 3 to 15 moles of at least one saturated dicarboxylic acid selected from the group consisting of adipic acid, succinic acid, diglycolic acid, azelaic acid, succinic anhydride, suberic acid, and sebacic acid, (c) from 0.5 to 5 moles of propylene glycol, and (d) from 14 to 9 moles of ethylene glycol, the glycols providing sufficient hydroxyl groups to exceed by at least 5% but not over 15% the number of carboxyl groups in the acidic compounds, (B) from 40% to 60% by weight of a normally liquid resinous polymeric epoxide derived from at least one polyhydric phenol and at least one epihalohydrin, and (C) from 10% to 40% by weight, based on the total weight of (A) plus (B), of a bentonite-amine reaction product, said composition also containing catalytic amounts of catalysts to bring about the individual polymerization of the polyester (A) and the epoxide (B).

2. A composition as set forth in claim 1 which contains from 0.1 to 0.75 mole of glycerol.

3. A composition as set forth in claim 1 which contains a polymerization inhibitor.

4. A composition as set forth in claim 1 wherein up to 20 mole percent of the propylene glycol and ethylene glycol is replaced with an equimolar proportion of higher glycols.

5. An electrical member comprising an electrical conductor and a body of molded, thermoset resinous insulation applied thereto, said insulation comprising a tough and flexible solid mixture comprising (A) from 60% to 40% by weight of a polyester resin derived by heating at a temperature of from 150° C. to 260° C. (a) one mole of at least one unsaturated dicarboxylic acid selected from the group consisting of fumaric acid, itaconic acid, maleic acid, maleic anhydride, chloromaleic acid, citraconic anhydride, and citraconic acid, (b) from 3 to 15 moles of at least one saturated dicarboxylic acid selected from the group consisting of adipic acid, succinic acid, diglycolic acid, azelaic acid, succinic anhydride, suberic acid, and sebacic acid, (c) from 0.5 to 5 moles of propylene glycol, and (d) from 14 to 9 moles of ethylene glycol, the glycols providing sufficient hydroxyl groups to exceed by at least 5% but not over 15% the number of carboxyl groups in the acidic compounds, (B) from 40% to 60% by weight of a normally liquid resinous polymeric epoxide derived from at least one polyhydric phenol and at least one epihalohydrin, and (C) from 10% to 40% by weight, based on the total weight of (A) plus (B), of a bentonite-amine reaction product.

6. A transformer provided with secondary windings comprising, in combination, a transformer case having an opening in the top, a solid casting of a normally liquid resinous polymeric epoxide derived from at least one polyhydric phenol and at least one epihalohydrin for closing the top of the transformer case, transformer conductor bars cast in the epoxide casting, said conductor bars being provided with a tough and flexible body of a thermoset solid resinous insulation comprising (A) from 60% to 40% by weight of a polyester resin derived by heating at a temperature of from 150° C. to 260° C. (a) one mole of at least one unsaturated dicarboxylic acid selected from the group consisting of fumaric acid, itaconic acid, maleic acid, maleic anhydride, chloromaleic acid, citraconic anhydride, and citraconic acid, (b) from 3 to 15 moles of at least one saturated dicarboxylic acid selected from the group consisting of adipic acid, succinic acid, diglycolic acid, azelaic acid, succinic anhydride, suberic acid, and sebacic acid, (c) from 0.5 to 5 moles of propylene glycol, and (d) from 14 to 9 moles of ethylene glycol, the glycols providing sufficient hydroxyl groups to exceed by at least 5% but not over 15% the number of carboxyl groups in the acidic compounds, (B) from 40% to 60% by weight of a normally liquid resinous polymeric epoxide derived from at least one polyhydric phenol and at least one epihalohydrin, and (C) from 10% to 40% by weight, based on the total weight of (A) plus (B), of a bentonite-amine reaction product, said conductor bars being so cast in the epoxide casting that the epoxide casting surrounds the insulation applied to the bars and the bars align with the secondary windings and with one another to facilitate the making of electrical connections.

7. An electrical member comprising a plurality of electrical conductors cast in predetermined spacial relationship in a solid casting of a normally liquid resinous polymeric epoxide derived from at least one polyhydric phenol and at least one epihalohydrin, said conductor bars being provided with a body of a tough and flexible thermoset solid resinous insulation comprising (A) from 60% to 40% by weight of a polyester resin derived by heating at a temperature of from 150° C. to 260° C. (a) one mole of at least one unsaturated dicarboxylic acid selected from the group consisting of fumaric acid, itaconic acid, maleic acid, maleic anhydride, chloromaleic acid, citraconic anhydride, and citraconic acid, (b) from 3 to 15 moles of at least one saturated dicarboxylic acid selected from the group consisting of adipic acid, succinic acid, diglycolic acid, azelaic acid, succinic anhydride, suberic acid, and sebacic acid, (c) from 0.5 to 5 moles of propylene glycol, and (d) from 14 to 9 moles of ethylene glycol, the glycols providing sufficient hydroxyl groups to exceed by at least 5% but not over 15% the number of carboxyl groups in the acidic compounds, (B) from 40% to 60% by weight of a normally liquid resinous polymeric epoxide derived from at least one polyhydric phenol and at least one epihalohydrin, and (C) from 10% to 40% by weight, based on the total weight of (A) plus (B), of a bentonite-amine reaction product.

References Cited in the file of this patent

UNITED STATES PATENTS

| | | |
|---|---|---|
| 2,531,440 | Jordan | Nov. 28, 1950 |
| 2,611,002 | James | Sept. 16, 1952 |
| 2,634,244 | Simon et al. | Apr. 7, 1953 |
| 2,691,007 | Cass | Oct. 5, 1954 |
| 2,773,043 | Zukas | Dec. 4, 1956 |

OTHER REFERENCES

Electrical Manufacturing, March 1953 (page 37). (Copy in Scientific Library and in Div. 69.)

Modern Plastics (Alloying with Epoxies), page 157, vol. 32, No. 1, September 1954, in Div. 50.